(12) United States Patent
Knoedgen et al.

(10) Patent No.: US 7,248,347 B2
(45) Date of Patent: Jul. 24, 2007

(54) FOCUS PROCESSING WITH THE DISTANCE OF DIFFERENT TARGET WHEELS

(75) Inventors: Horst Knoedgen, Munich (DE); Dirk Huettmann, Baltmannsweiler (DE)

(73) Assignee: Dialog Imaging Systems GmbH, Kirchheim/Teck-Nabern (DE)

( * ) Notice: Subject to any disclaimer, the term of this patent is extended or adjusted under 35 U.S.C. 154(b) by 349 days.

(21) Appl. No.: 10/929,300

(22) Filed: Aug. 30, 2004

(65) Prior Publication Data

US 2006/0038976 A1    Feb. 23, 2006

(30) Foreign Application Priority Data

Aug. 17, 2004  (EP) .................................. 04368058

(51) Int. Cl.
*G01B 9/00* (2006.01)
(52) U.S. Cl. ...................................... 356/124; 356/125
(58) Field of Classification Search ................ 356/124, 356/124.5
See application file for complete search history.

(56) References Cited

U.S. PATENT DOCUMENTS

| 4,298,944 | A  | 11/1981 | Stoub et al. ................. 364/515 |
| 4,612,666 | A  | 9/1986  | King .............................. 382/32 |
| 5,179,437 | A  | 1/1993  | Kawada et al. ................ 358/10 |
| 5,649,258 | A  | 7/1997  | Bergstresser et al. ........ 396/429 |
| 6,195,159 | B1 | 2/2001  | MacDonald et al. ......... 356/123 |
| 6,201,600 | B1 | 3/2001  | Sites et al. ................... 356/124 |
| 6,219,443 | B1 | 4/2001  | Lawrence .................... 382/141 |
| 6,512,587 | B1 | 1/2003  | Marcus et al. ............... 356/497 |
| 2002/0191973 | A1 | 12/2002 | Hofer et al. ................... 396/80 |
| 2003/0002749 | A1 | 1/2003  | Vehvilainen ................. 382/275 |
| 2003/0030648 | A1 | 2/2003  | Baer ........................... 345/589 |
| 2003/0112360 | A1 | 6/2003  | Liao et al. .................... 348/362 |

(Continued)

FOREIGN PATENT DOCUMENTS

EP    0679932    11/1995

(Continued)

OTHER PUBLICATIONS

Co-pending U.S. Patent App., filed Apr. 16, 2003, U.S. Appl. No. 10/417,317, assigned to the same assignee, "Miniature Camera Module".

(Continued)

*Primary Examiner*—F. L. Evans
(74) *Attorney, Agent, or Firm*—Saile Ackerman LLC; Stephen B. Ackerman

(57) ABSTRACT

An apparatus and method for automatically focusing a miniature digital camera module (MUT) is described. A MUT is loaded onto a test fixture and aligned with an optics system of a test handler. Focus targets contained within two target wheels are positioned over an optical centerline above the digital camera module using stepper motors. A field lens is positioned to focus an image of the targets onto the lens opening of the MUT. The image can be of a single target or a combination of targets contained on the target wheels at various optical distances from the MUT. A focusing unit adjusts the lens cap of the MUT for a best focus setting and after the MUT has been tested the best focus setting if physically fixed by permanently connecting the lens cap to the body of the MUT.

42 Claims, 11 Drawing Sheets

U.S. PATENT DOCUMENTS

| | | | |
|---|---|---|---|
| 2003/0142374 A1 | 7/2003 | Silverstein | 358/504 |
| 2003/0146976 A1 | 8/2003 | Liu | 348/207.1 |
| 2004/0027456 A1 | 2/2004 | Pierce | 348/175 |
| 2004/0032496 A1 | 2/2004 | Ebenstein et al. | 348/187 |

FOREIGN PATENT DOCUMENTS

| | | |
|---|---|---|
| EP | 819927 A | 1/1998 |
| EP | 1286553 | 2/2003 |
| EP | 1348996 A | 10/2003 |
| EP | 1382194 A1 | 1/2004 |
| EP | 1389878 A1 | 2/2004 |
| JP | 03099376 A | 4/1991 |
| JP | 2001292461 | 10/2001 |
| JP | 2002077955 | 3/2002 |
| JP | 2002232918 | 8/2002 |
| JP | 2002290994 | 10/2002 |
| JP | 2002345001 A | 11/2002 |
| JP | 2003101823 | 4/2003 |
| JP | 2003157425 | 5/2003 |
| JP | 2003179949 | 6/2003 |
| JP | 2003219436 | 7/2003 |
| JP | 2003259126 | 9/2003 |
| JP | 2004226462 A | 8/2004 |
| WO | WO 02102060 | 12/2002 |

OTHER PUBLICATIONS

Co-pending U.S. Patent App., filed May 8, 2003, U.S. Appl. No. 10/434,743, assigned to the same assignee, "Test System for Camera Modules".

Co-pending U.S. Patent App., filed Aug. 31, 2004, U.S. Appl. No. 10/930,351, to the same assignee.

Co-pending, U.S. Patent App., filed Aug. 30, 2004, U.S. Appl. No. 10/929,651, to the same assignee.

Co-pending U.S. Patent App., filed Aug. 31, 2004, U.S. Appl. No. 10/930,353, to the same assignee.

Co-pending U.S. Patent App., filed Aug. 30, 2004, U.S. Appl. No. 10/929,652, to the same assignee.

Co-pending U.S. Patent App., filed Aug. 30, 2004, U.S. Appl. No. 10/929,653, to the same assignee.

FOCUS PROCESSING WITH THE DISTANCE OF DIFFERENT TARGET WHEELS

This application is related to U.S. patent application Ser. No. 10/930,351, filed on Aug. 31, 2004, and assigned to the same assignee as the present invention.

This application is related to U.S. patent application Ser. No. 10/929,651, filed on Aug. 30, 2004, and assigned to the same assignee as the present invention.

This application is related to U.S. patent application Ser. No. 10/930,353, filed on Aug. 31, 2004, and assigned to the same assignee as the present invention.

This application is related to U.S. patent application Ser. No. 10/929,652, filed on Aug. 30, 2004, and assigned to the same assignee as the present invention.

This application is related to U.S. patent application Ser. No. 10/929,653, filed on Aug. 30, 2004, and assigned to the same assignee as the present invention.

BACKGROUND OF THE INVENTION

1. Field of Invention

The present invention is related to focusing a digital camera under test, and in particularly focusing miniature digital camera modules during a focus and test operation using targets located in target wheels.

2. Description of Related Art

The digital camera is becoming a ubiquitous device. Not only are digital cameras replacing the traditional film camera, digital camera devices are being used in many other applications, such as small electronic devices, such as PDA (personal data assistant) and cellular phones. With the explosion of cellular phones, the ability to take a picture and then send that picture to another individual using a second cellular phone comes the need to produce inexpensive digital camera modules and efficiently test these modules in large quantities. This is further complicated by the many different module configurations that are emerging as a result of the many different application requirements, including fixed focus, manual focus and automatic focus as well as physical size. Some of these modules are very small and others have signal leads in the form of a flex filmstrip. The testing time for digital camera module, which can have mega-pixel capability, has traditionally been a relatively long process (approximately sixty seconds for a module with 0.3 mega pixels) to insure the integrity and picture quality of the camera. Quality testing at a low cost has become the utmost of importance. This necessitates a testing capability that is fast and insures the integrity and specification of the digital camera module while testing a large quantity of modules.

A patent application, Ser. No. 10/417,317 dated Apr. 16, 2003, is related to miniature cameras and their manufacturing methods that are used as built-in modules in hand held consumer electronics devices such as mobile phones and PDA's. In a second patent application, Ser. No. 10/434,743 dated May 8, 2003, a test system is described for digital camera modules used as built-in modules for consumer electronics, which performs electrical tests, adjustment of focus and sealing of the lens barrel with glue.

In addition there are a number of other prior art patents that are directed to testing of digital cameras: US 20040032496A1 (Eberstein et al.) is directed to a method of camera calibration and quality testing; EP 1389878A1 (Bednarz et al) is directed to a method of camera calibration and testing camera quality; US 20040027456A1 Pierce) directed to the use of calibration targets; EP 1382194A1 (Baer) is directed to dark current subtraction; JP 2003259126 (Keisuke) is directed to removing noise of an image; US 20030146976A1 (Liu) is directed to a digital camera system enabling remote monitoring; JP 2003219436 (Fuminori) is directed to adjustment of a pixel shift camera; US 2003142374 (Silverstein) is directed to calibrating output of an image output device; JP 2003179949 (Hidetoshi) is directed to a luminance level inspection apparatus; JP 2003157425 (Vehvilainen) is directed to improving image quality produced in a mobile imaging phone; JP 2003101823 (Kenichi) is directed to specifying a picture data area; EP 1286553A2 (Baer) is directed to a method and apparatus for improving image quality; US 20030030648 (Baer) is directed to a method and apparatus for improving image quality in digital cameras; U.S. Pat. No. 6,512,587 (Marcus et al.) is directed to measurement method and apparatus of an imager assembly; US 20030002749 (Vehvilainen) is directed to a method and apparatus for improving image quality; US 20020191973 A1 (Hofer et al.) is directed to a method and apparatus for focus error reduction; WO 2002102060 A1 (Baer) is directed to a method and apparatus for smear in digital images using a frame transfer sensor; JP 2002290994 (Hidetoshi) is directed to a method and apparatus to detect foreign matter on the surface of a lens; JP 200223918 (Yanshinao) is directed to an image inspection device and method for a camera module; JP 2002077955 (Keisuke) is directed to a method and apparatus for evaluating camera characteristics; JP 2001292461 (Keisuke) is directed to a system and method for evaluating a camera; U.S. Pat. No. 6,219,443 B1 (Lawrence) is directed to a method and apparatus for inspecting a display using a low resolution camera; U.S. Pat. No. 6,201,600 B1 (Sites et al.) is directed to a method and apparatus for inspection of optically transmissive objects having a lens; U.S. Pat. No. 5649258 (Bergstresser et al.) is directed to an apparatus and testing of a camera; EP 0679932 B1 (Kobayashi et al.) is directed to testing an electronically controlled camera; U.S. Pat. No. 5,179,437 (Kawada et al.) is directed to an apparatus for color correction of image signals of a color television camera; JP 03099376 (Hiroshi) is directed to the quality of a display screen; U.S. Pat. No. 4,612,666 (King) is directed to a pattern recognition apparatus; and U.S. Pat. No. 4,298,944 Stoub et al.) is directed to a method and apparatus for distortion correction for scintillation cameras.

SUMMARY OF THE INVENTION

It is an objective of the present invention to automatically focus digital camera modules under test (MUT) using focus targets at different optical distances from the MUT.

It is also an objective of the present invention to verify that the distance setting of the focus targets provides the best focus of a MUT.

It is still an objective of the present invention to first focus the MUT, then leave the focus setting in place throughout subsequent testing, and permanently fix the focus after testing is complete.

It is further an objective of the present invention to use a plurality of focus targets to focus the MUT.

It is still further an objective of the present invention to use a plurality of focus target simultaneously, each target at a different optical distance, to set the focus of the MUT.

In the present invention a tray of untested digital camera modules is transported to an alignment mark on a conveyor near a robot and two test stations. The robot selects a first digital camera module from the tray and places the module into a first test station. While the first digital camera module is being focused and tested, the robot selects a second digital camera module and places the second module into the second test station. Upon completion of the testing of the first digital camera module, the robot returns the first module to the tray and testing begins in the second test station. Each test station comprises a light source with a diffuser, two target wheels, a field lens, and a test fixture for holding and electrically contacting a digital camera module under test (MUT).

It is within the scope of the present invention that the robot selects and transports more than one MUT from the tray to a test station. The plurality of MUT's would be positioned into a plurality of test fixtures within the test station. This requires additional focus motors and associated focus apparatus, but a single optics system could be used where the plurality of MUT's are separately positioned under the optics system for focus. An alternative is a plurality of optics systems within a test station, one for each MUT that is to be focused.

The light source consists of a plurality of serial connected strings of light emitting diodes (LED). Each string of LED devices produces a different color of light, where the color of light comprises red, green, blue and infrared. The LED devices provide a stable light that can be turned on and off quickly; however, other sources of light, which meet the test requirements, can be used.

Each target wheel contains six target holders into which two targets can be placed at different distances. The targets are small and the target wheels can be rotated quickly to position a target holder within the optical axis over the MUT using a stepper motor that steps the target wheel in sixty-degree increments. The use of stepper motors provide a convenient means for positioning the target wheels; however, it is within the scope of the present invention to use any motor that can position the target holders and meet the test and focus requirements of the MUT.

The distance between the target wheels is critical and is adjusted in an initial setup by stepper motors to within a range of 1 mm. The field lens focuses the light from the targets onto the lens of the MUT, and a stepper motor adjusts the distance of the field lens from the MUT. Another stepper motor adjusts a focus unit in contact with a lens cap of the MUT to focus the digital camera module under test.

During the initial setup of the targets a visual verification is made to insure that the best possible focus adjustment of the MUT can be made. The best possible focus is somewhat subjective and is preferably done with the customer of the tested MUT. Once the setup of the targets and field lens is verified, the settings of the stepper motors are stored in the tester and used to test untested digital camera modules.

BRIEF DESCRIPTION OF THE DRAWINGS

This invention will be described with reference to the accompanying drawings, wherein.

DETAILED DESCRIPTION OF THE PREFERRED EMBODIMENT

Figure 1:
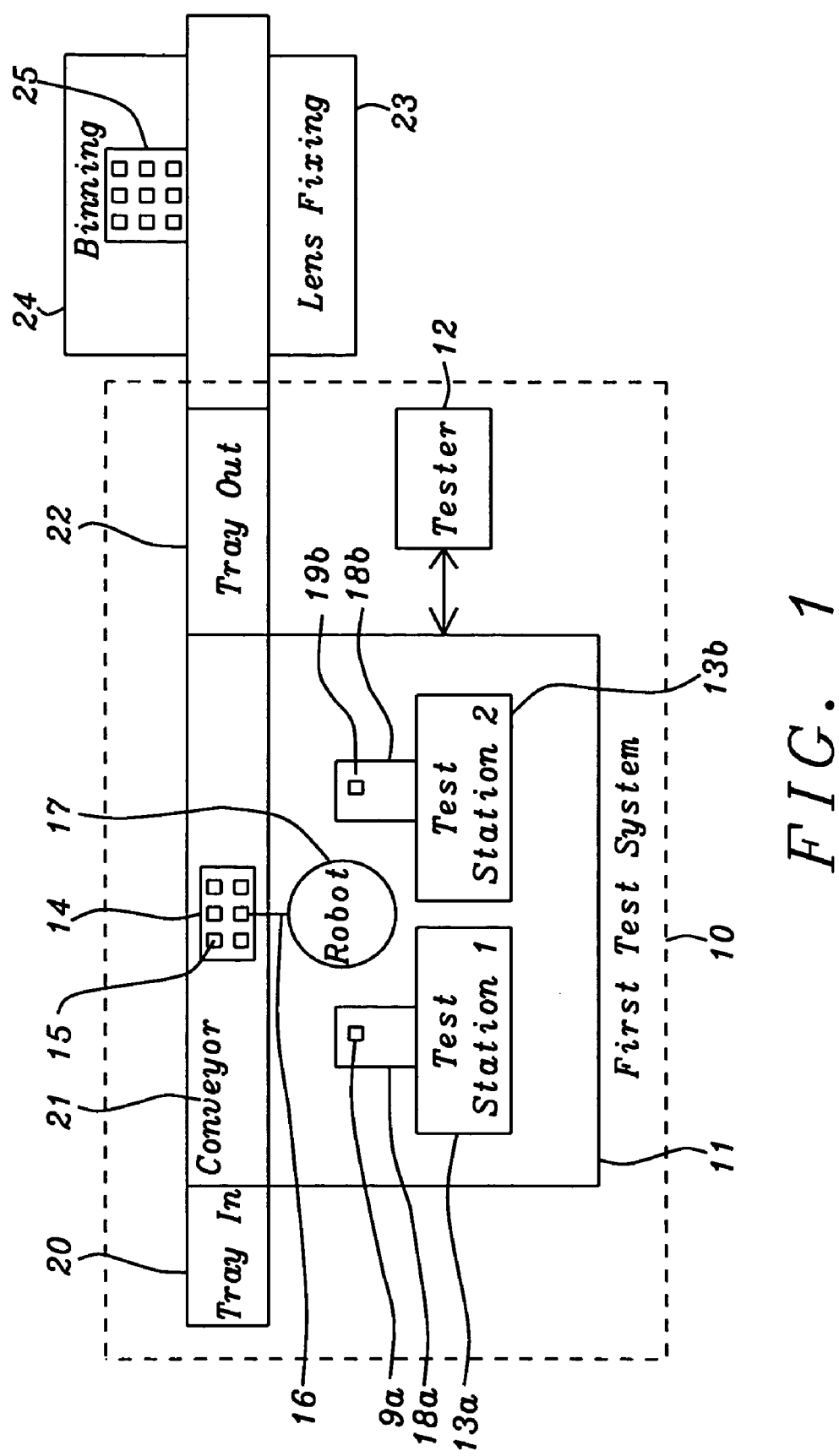
FIG. 1 is a plan view of a test handler containing test stations, each of which contain the optics system for focusing a MUT of the present invention.

In FIG. 1 is a plan view of a test system 10 used to test miniature digital camera modules. The test system contains a test handler 11 and a tester 12. The tester 12 controls the handler 11 to move, select, focus and test the digital camera modules. A metal tray 14 is loaded with untested digital camera modules 15 at the tray in area 20 and moved by a conveyor 21 to an alignment mark 16 near a robot 17. The robot 17 selects a first module from the tray 14 and places the module into a test fixture 18a of a first test station 13a. The module is clamped in place and electrical contact is made to the I/O leads of the module. The module is then positioned under an optics system (shown in FIG. 2) contained within the first test station 13a. The focus and testing is then commenced on the first digital camera module under test (MUT) 19a.

When the focus and testing of the first MUT 19a commences, the robot selects a second digital camera module and places the module 19b onto the test fixture 18b of the second test station 13b. At the completion of the focus and test routines the robot returns the tested MUT 19a to the tray 14 and focus and test routines are applied to the second MUT 19b. When all of the digital camera modules 15 on the tray 14 have been tested, the conveyor moves the tray to the tray out area 22. The focus adjustment made in the test stations 13a and 13b are then permanently fixed at the lens fixing area 23 by the use of glue or other means such as welding the lens cap of the focused module with a laser or by use of a physical pin. Once the focus has been fixed 23, the modules are sorted into part number trays 25 in the binning area 24.

Figure 2:
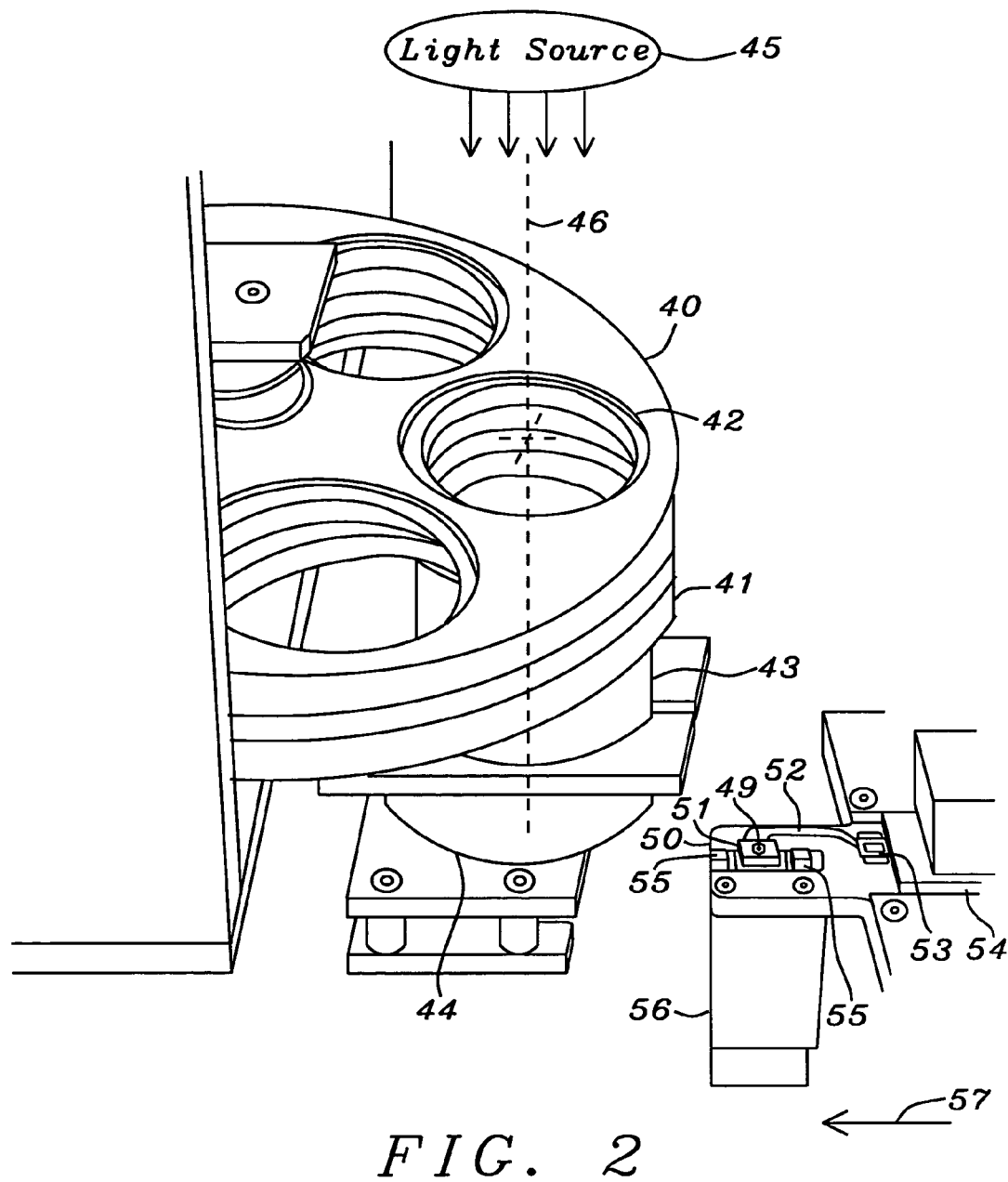
FIG. 2 is an isometric view of the optics system of the present invention.

FIG. 2 shows an isometric view of a portion of a test station 13a and 13b (FIG. 1). Two target wheels 40 and 41 each containing six target holders 42 are positioned such that one target holder 42 in each target wheel is aligned with the optical centerline 46 of the optics system of the test station.

Below the target wheels is shown a field lens 43 that is above a focusing unit 44 that makes physical contact with the lens cap 49 of a digital camera module under test 51 to adjust the focus of the digital camera module. A light source 45 is located above the top target wheel 40.

Continuing to refer to FIG. 2, a test fixture 50 is shown with a digital camera module 51 that has not been clamped in place by the clamping elements 55 that are actuated by the clamp control unit 56. The leads 52 of the digital camera module 51 are connected to a connector printed circuit board 53 containing module I/O contacts. A test station contactor 54 is positioned over the I/O contacts when the digital camera module is clamped in place to make electrical contact to the digital camera module. Once the digital camera module is clamped, the test fixture is moved 57 aligning the digital camera module under the centerline 46 of the optics system.

Figure 3:
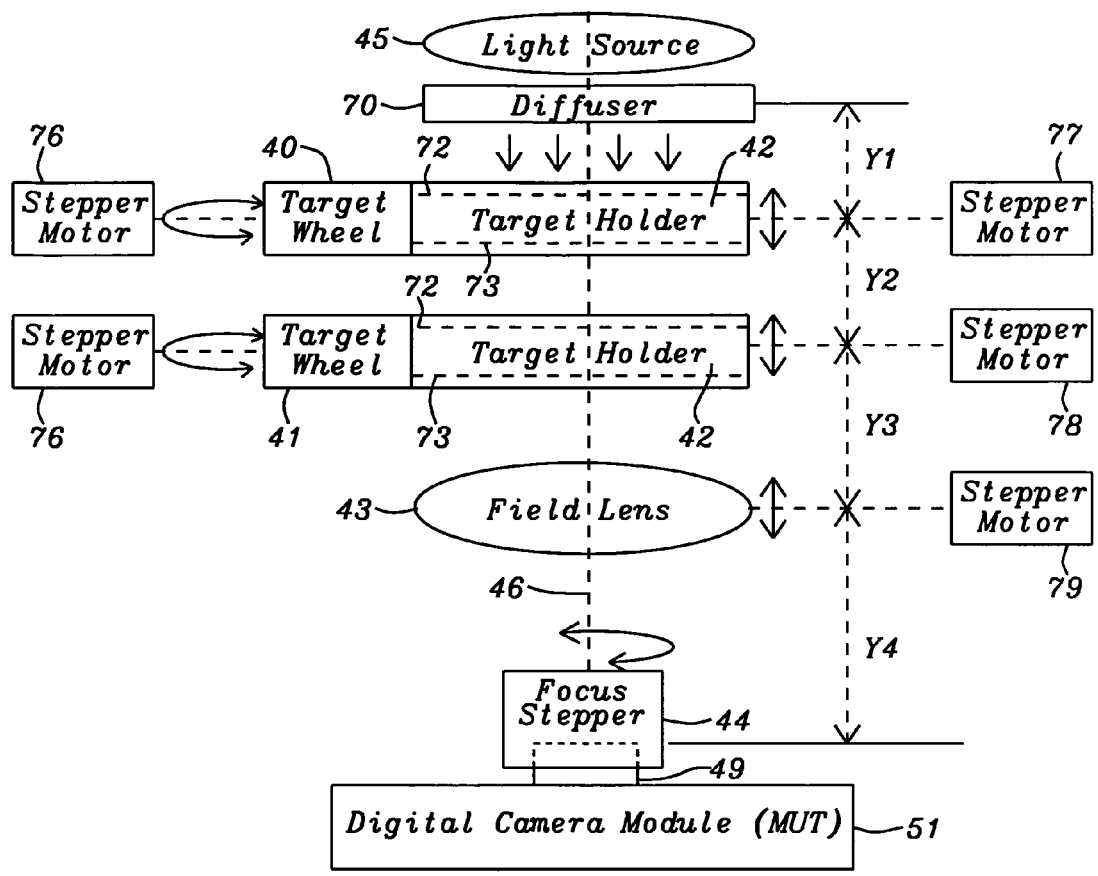
FIG. 3 is a diagram, which show the optics system of the present invention.

In FIG. 3 is shown a diagram of the optics system contained in a test station 13a and 13b (FIG. 1). An upper target wheel 40 and a lower target wheel 41 each containing six target holders 42 are positioned under a light source 45 and a light diffuser 70. Each of the six target holders 42 located in the upper and lower target wheels 40 and 41 can hold a target in an upper position 72 and in a lower position 73. A field lens 43 is positioned under the target holders 42 and is aligned with the optical centerline 46 of the test station. The focus stepper mechanism 44 is in contact with the lens cap 49 of the MUT 51, and is used to adjust the lens cap 49 to achieve optimal focus of the MUT 51.

Continuing to refer to FIG. 3, stepper motors 76 are used to rotate the target wheels 40 and 41 in order to center the target holders 42 within the optical centerline 46 of the test station. Since there are six target holders 42 in each target wheel 40 and 41, the stepper motors 76 rotate the target wheels in sixty-degree increments. Stepper motors 77 and 78 control the position of the target wheels 40 and 41 above the MUT. The distance Y1 between the light source 45 and the diffuser 70 and the upper target wheel 40 is typically about 100 mm, which is not critical. The distance Y2 between the two target wheels 40 and 41 is critical and has a typical distance of approximately 150 mm that is adjusted to within approximately 1 mm. The distance Y3 is critical and is adjusted by stepper motor 79 such that the field lens is very close to the lower target wheel to within approximately 1 mm. The distance Y4 between the field lens 43 and the lens cap 49 of the MUT 51 is not critical and is in the range of approximately 30-50 mm. The field lens is used to focus the image of the targets onto the lens opening in the lens cap 49 of the MUT 50.

Figure 4A:
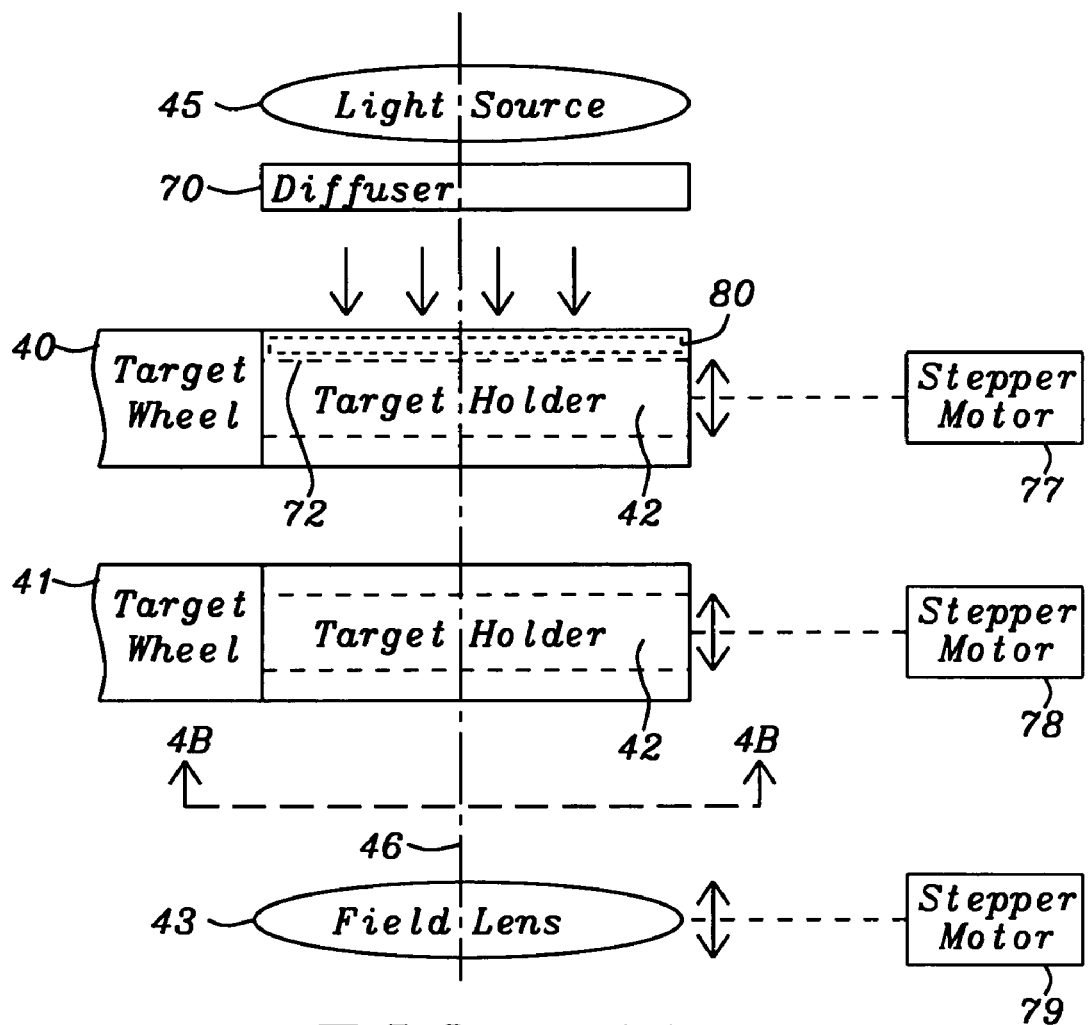
FIG. 4A is a diagram showing a distant focus target positioned in a target holder of the present invention.

In FIG. 4A is shown a far distance focus target 80 located in an upper target position 72 of a target holder 42 of the upper target wheel 40. The target wheel is adjusted along the optical axis 46 by the stepper motor 77 to provide a distance setting of the far distant focus target 80 from the MUT 51 (FIG. 3). The field lens is then adjusted by the stepper motor 79 to focus an image of the target 80 onto the lens opening on the lens cap 49 (FIG. 3). The adjustment setting of the stepper motors 77 and 79 are then recorder for use in the focusing of a MUT using the focus target 80.

Figure 4B:
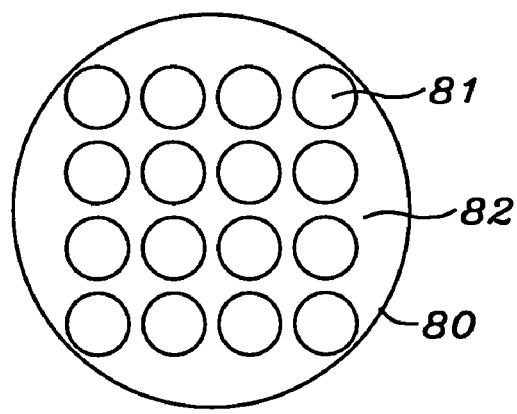
FIG. 4B is a diagram showing the distant target as viewed by the MUT.

FIG. 4B shows the image of the focus target 80 as seen by the MUT 51. The focus target consists of light areas (holes) 81 and dark areas (no-holes) 82. The preferred hole shape is circular; however, other shapes such as rectangular, hexagonal, octagonal, oval, etc., can be used. The holes 81 are relatively large for the far distance target 80 as compared to targets that are located closer to the MUT 51. The hole pattern shown in FIG. 4B is for illustrative purposes and is does not necessarily represent the hole pattern in the actual focus target. The focus stepper 44 (FIG. 3) adjusts the lens cap 49 until a maximum brightness is attained of the focus target image that is captured by the MUT 51. The point at which maximum brightness is obtained is approximately the best focus adjustment of the lens cap 49 for the far distance target.

Figure 5A:
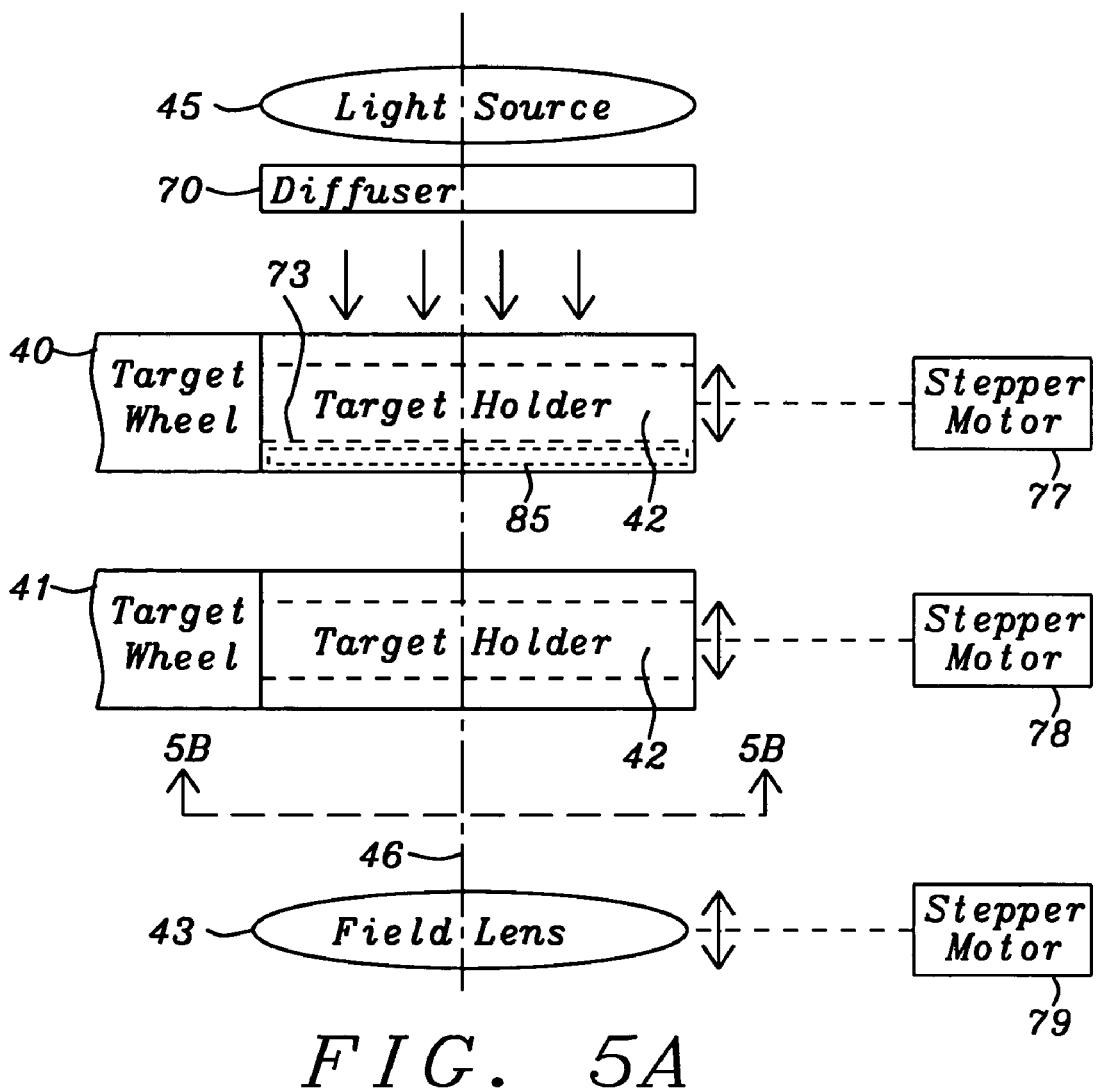
FIG. 5A is a diagram showing a first intermediate focus target positioned in the target holder of the present invention.

In FIG. 5A is shown an intermediate focus target 85 located in an lower target position 73 of a target holder 42 of the upper target wheel 40. The target wheel is adjusted along the optical axis 46 by the stepper motor 77 to provide an intermediate focus target for the MUT 51 (FIG. 3). The field lens 43 is then adjusted by the stepper motor 79 to focus an image of the target 85 onto the lens opening on the lens cap 49 (FIG. 3). The adjustment setting of the stepper motors 77 and 79 are then recorder for use in the focusing of a MUT using the focus target 85.

Figure 5B:
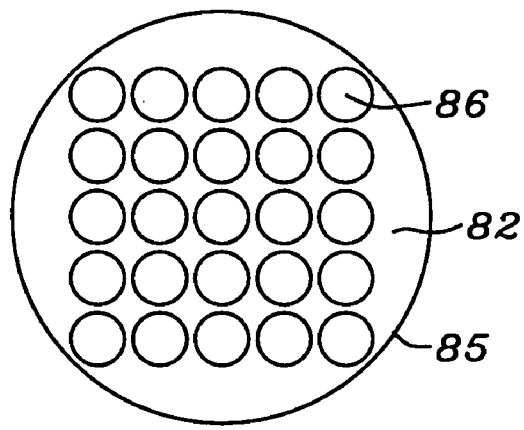
FIG. 5B is a diagram showing the first targets as viewed by the MUT.

FIG. 5B shows the image of the focus target 85 as seen by the MUT 51. The focus target consists of light areas (holes) 86 and dark areas (no-holes) 82. The preferred hole shape is circular; however, other shapes such as rectangular, hexagonal, octagonal, oval, etc., can be used. The holes 86 are relatively smaller than the holes 81 on the far distance target 80 (FIG. 4A and 4B). The hole pattern shown in FIG. 5B is for illustrative purposes and is does not necessarily represent the hole pattern in the actual focus target. The focus stepper 44 (FIG. 3) adjusts the lens cap 49 until a maximum brightness is attained of the focus target image that is captured by the MUT 51. The point at which maximum brightness is obtained is approximately the best focus adjustment of the lens cap 49 for the intermediate distance target 85.

Figure 6A:
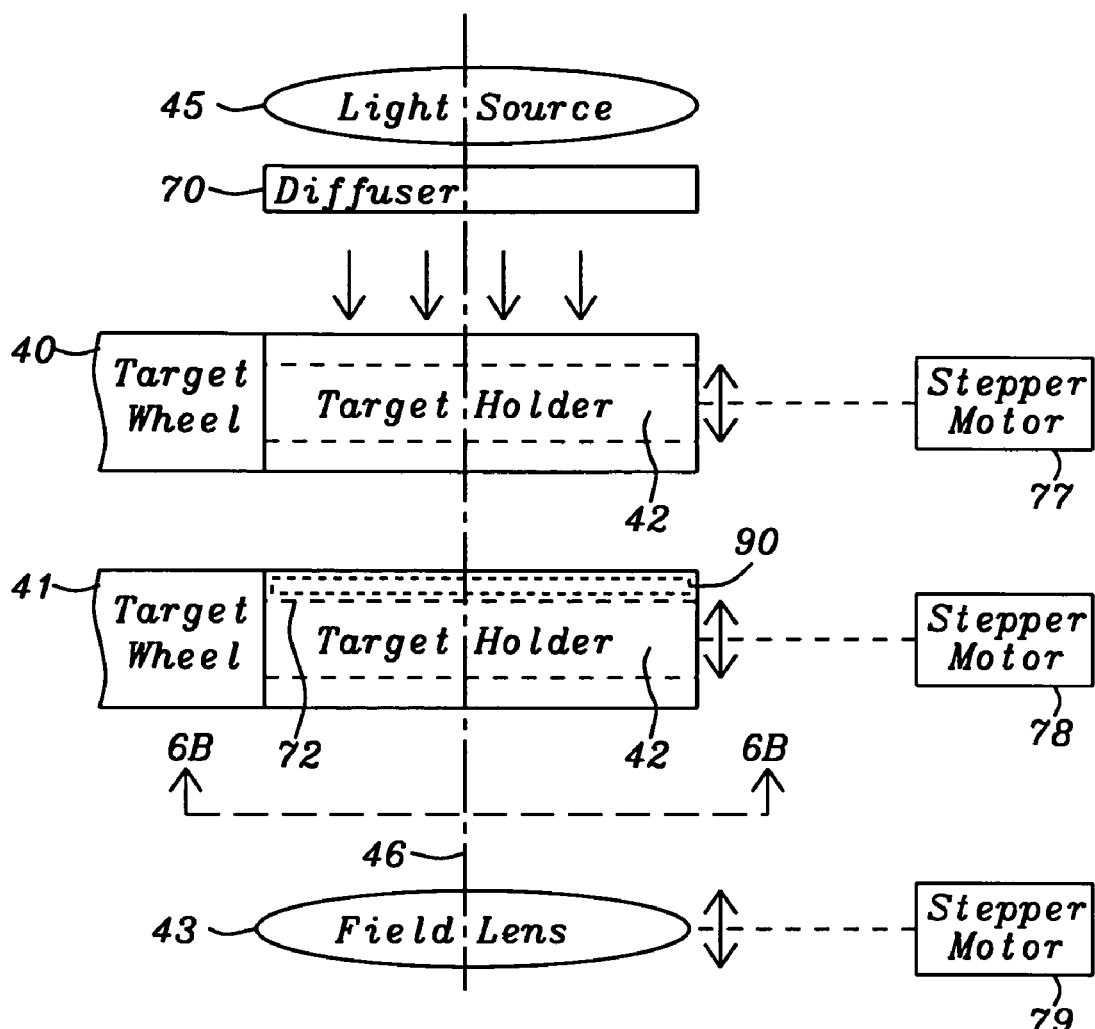
FIG. 6A is a diagram showing a second intermediate focus target positioned in the target holder of the present invention.

In FIG. 6A is shown an intermediate focus target 90 located in an upper target position 72 of a target holder 42 of the lower target wheel 41. The target wheel is adjusted along the optical axis 46 by the stepper motor 78 to provide an intermediate focus target for the MUT 51 (FIG. 3). The field lens is then adjusted by the stepper motor 79 to focus an image of the target 90 onto the lens opening on the lens cap 49 (FIG. 3). The adjustment setting of the stepper motors 78 and 79 are then recorder for use in the focusing of a MUT using the focus target 90.

Figure 6B:
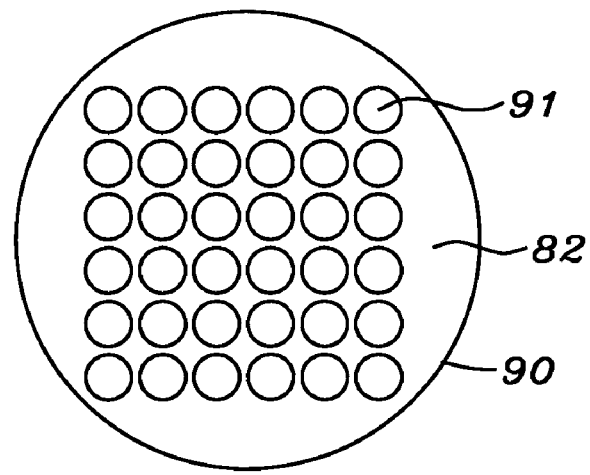
FIG. 6B is a diagram showing the second intermediate target as viewed by the MUT.

FIG. 6B shows the image of the focus target 90 as seen by the MUT 51. The focus target consists of light areas (holes) 91 and dark areas (no-holes) 82. The preferred hole shape is circular; however, other shapes such as rectangular, hexagonal, octagonal, oval, etc., can be used. The holes 91 are relatively smaller than the holes 86 on the intermediate target 85 (FIG. 5A and 5B). The hole pattern shown in FIG. 6B is for illustrative purposes and is does not necessarily represent the hole pattern in the actual focus target. The focus stepper 44 (FIG. 3) adjusts the lens cap 49 until a maximum brightness is attained of the focus target image that is captured by the MUT 51. The point at which maximum brightness is obtained is approximately the best focus adjustment of the lens cap 49 for the intermediate distance target 90.

Figure 7A:
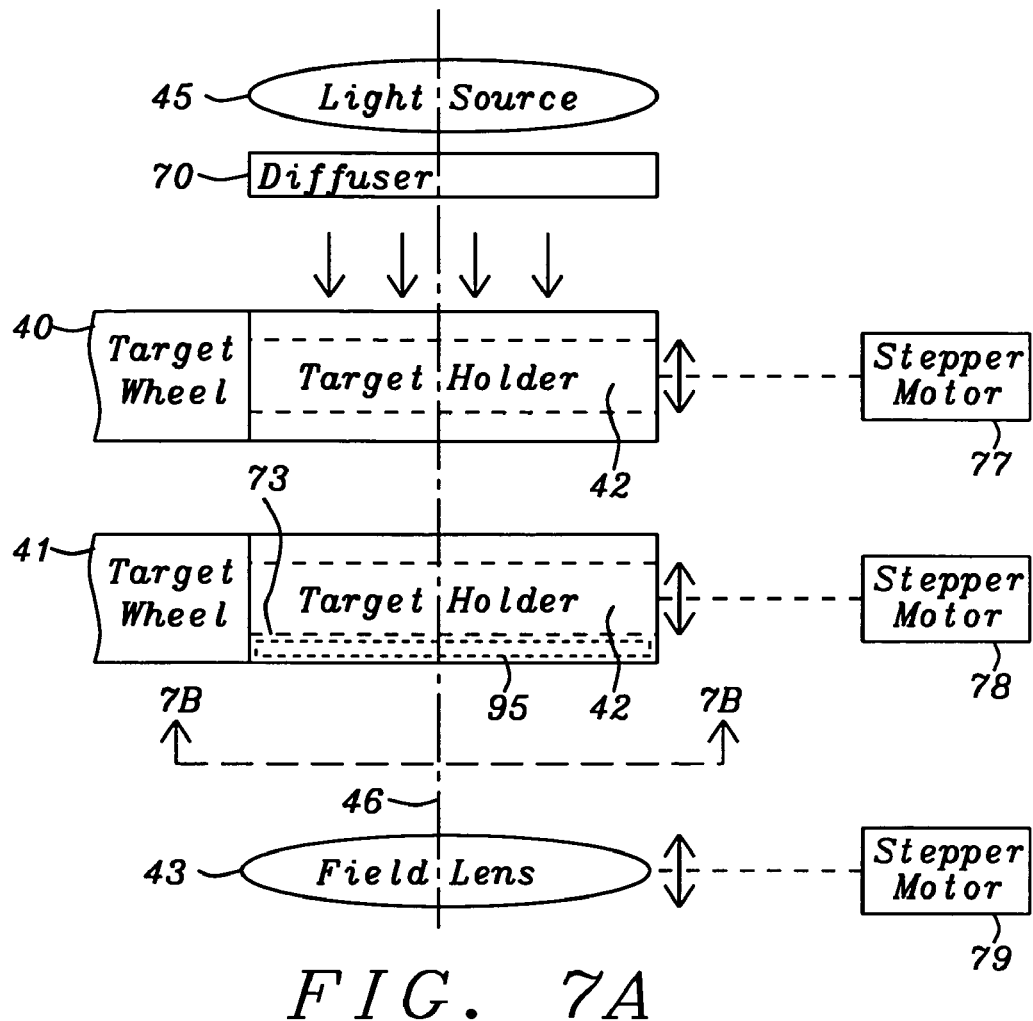
FIG. 7A is a diagram showing a closest focus target positioned in a target holder of the present invention.

In FIG. 7A is shown a close focus target 95 located in a lower target position 73 of a target holder 42 of the lower target wheel 41. The target wheel is adjusted along the optical axis 46 by the stepper motor 78 to provide a close focus target for the MUT 51 (FIG. 3). The field lens is then adjusted by the stepper motor 79 to focus an image of the target 95 onto the lens opening on the lens cap 49 (FIG. 3). The adjustment setting of the stepper motors 78 and 79 are then recorder for use in the focusing of a MUT using the focus target 95.

Figure 7B:
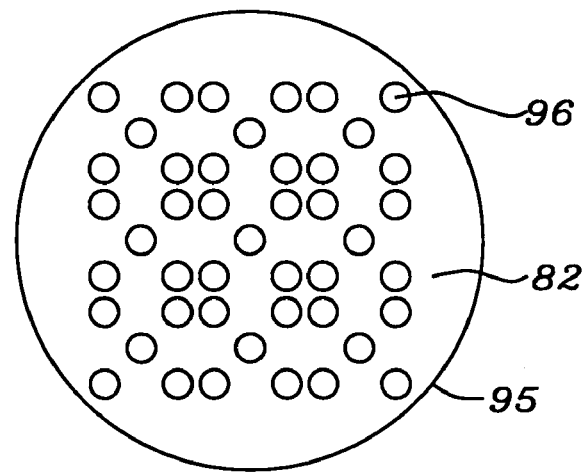
FIG. 7B is a diagram showing the closest target as viewed by the MUT.

FIG. 7B shows the image of the focus target 95 as seen by the MUT 51. The focus target consists of light areas (holes) 96 and dark areas (no-holes) 82. The preferred hole shape is circular; however, other shapes such as rectangular, hexagonal, octagonal, oval, etc., can be used. The holes 96 are relatively smaller than the holes 91 on the intermediate target 90 (FIG. 6A and 6B). The hole pattern shown in FIG. 7B is for illustrative purposes and is does not necessarily represent the hole pattern in the actual focus target. The focus stepper 44 (FIG. 3) adjusts the lens cap 49 until a maximum brightness is attained of the focus target image that is captured by the MUT 51. The point at which maximum brightness is obtained is approximately the best focus adjustment of the lens cap 49 for the close distance target 42.

Figure 8A:
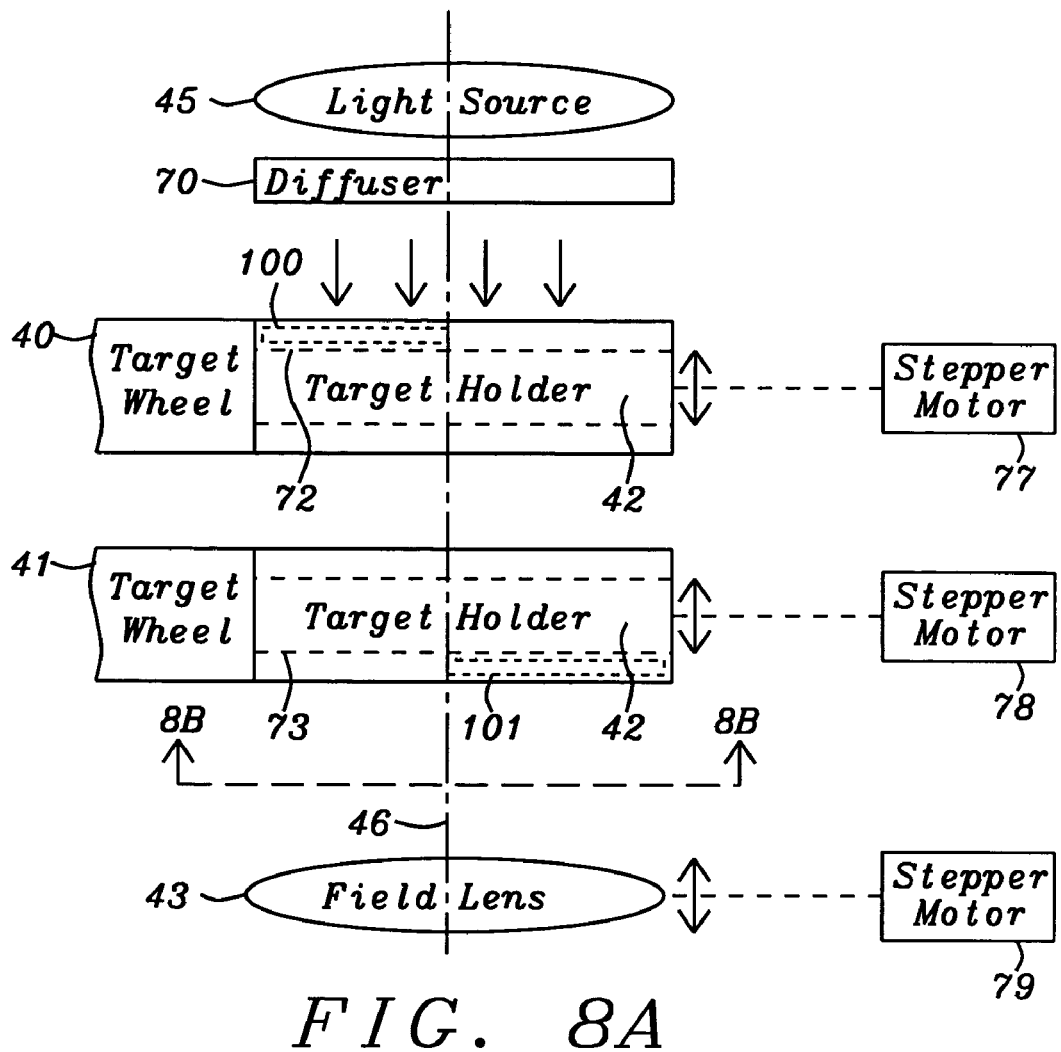
FIG. 8A is a diagram showing a combination of a distant and a closest focus target positioned in target holders of the present invention.

In FIG. 8A is shown a combination of a farthest focus target 100 located in an upper target position 72 of a target holder 42 of the upper target wheel 40 and a close focus target 101 located in a lower target position 73 of a target holder 42 of the lower target wheel 41. The focus target 100 occupies one half of the target position 72 and the focus target 101 occupies one half of the target position 73 such that the MUT views both targets simultaneously. The target wheel 40 is adjusted along the optical axis 46 by the stepper motor 77 to provide a farthest focus target distance for the MUT 51 (FIG. 3) and the target wheel 41 is adjusted along the optical axis 46 by the stepper motor 78 to provide a closest focus target distance for the MUT 51. The field lens is then adjusted by the stepper motor 79 to focus a combination image of the targets 100 and 101 onto the lens opening on the lens cap 49 (FIG. 3). The adjustment setting of the stepper motors 77, 78 and 79 are then recorder for use in the focusing of a MUT using the combination of focus targets 100 and 101.

Figure 8B:
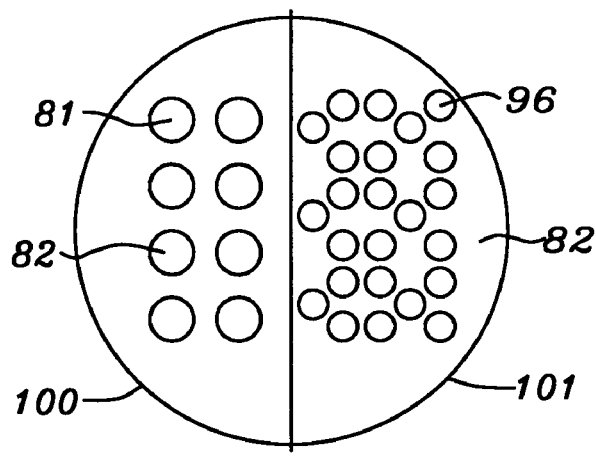
FIG. 8B is a diagram showing the combination of the distant and closest targets as viewed by the MUT.

FIG. 8B shows the image of the combination of focus targets 100 and 101 as seen by the MUT 51. The focus targets consists of light areas (holes) 81 and 96 and dark areas (no-holes) 82. The preferred hole shape is circular; however, other shapes such as rectangular, hexagonal, octagonal, oval, etc., can be used. The holes 96 of the close target 101 are smaller than the holes 81 on the farthest target 100. The hole pattern shown in FIG. 8B is for illustrative purposes and does not necessarily represent the hole pattern in the actual focus target. The focus stepper 44 (FIG. 3) adjusts the lens cap 49 until a maximum brightness is attained of the focus target image that is captured by the MUT 51.

Figure 9A:
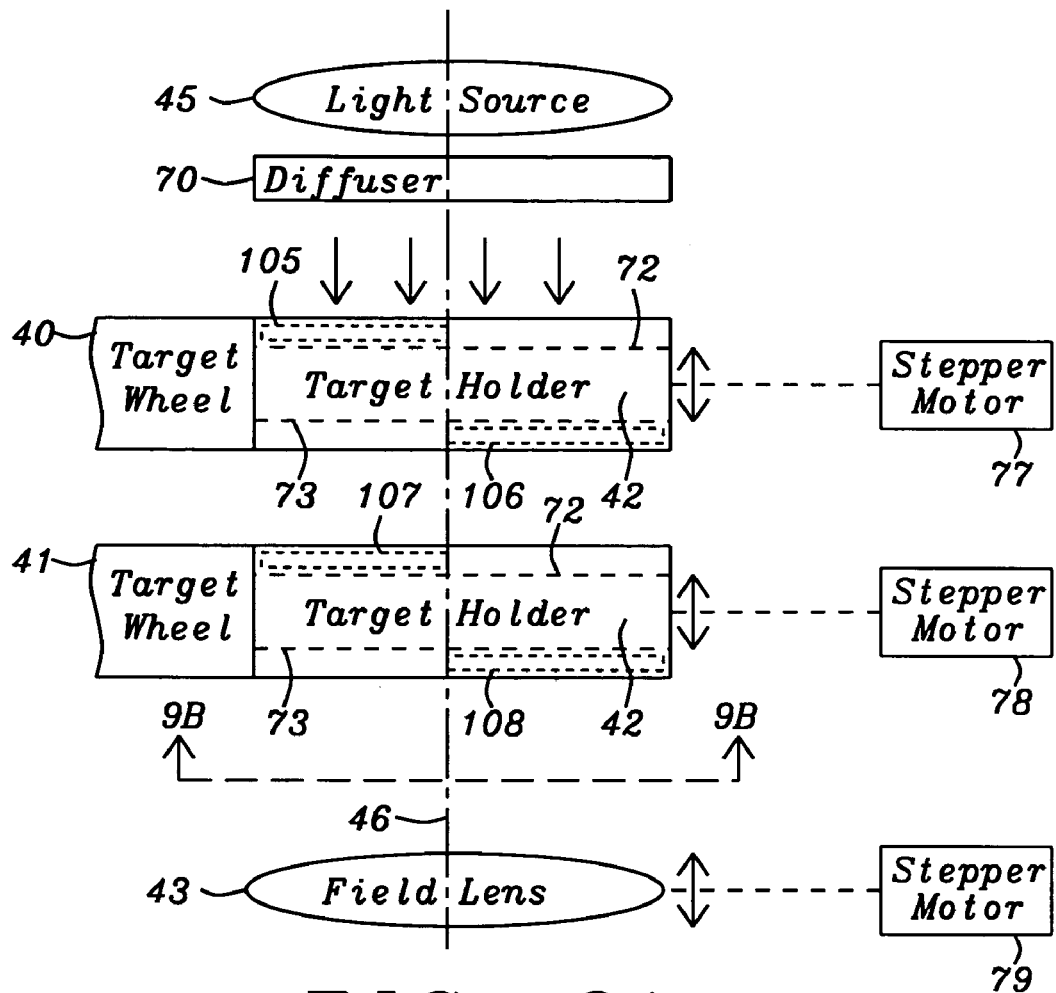
FIG. 9A is a diagram showing a combination of a distant, two intermediate and a closest focus target positioned in a target holder of the present invention.
Figure 9B:
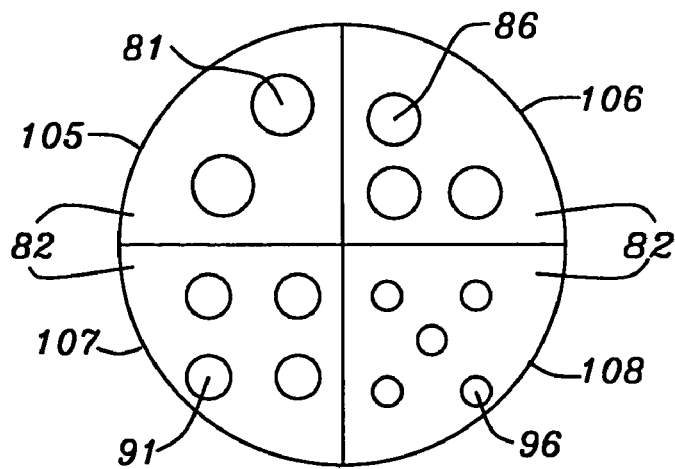
FIG. 9B is a diagram showing the combination of the distant, two intermediate and closest targets as viewed by the MUT.

In FIG. 9A is shown a combination of a farthest focus target 105, two intermediate targets 106 and 107, and a closest target 108. Each of the targets 105, 106, 107 and 108 occupy a quarter of a target holder 42 is such a way that allows the four targets 105, 106, 107 and 108 to be viewed simultaneously by a MUT 51 (FIG. 3) as shown in FIG. 9B. The farthest focus target 105 is located in an upper target position 72 of a target holder 42 of the upper target wheel 40. A first intermediate focus target 106 is located in a lower target position 73 of a target holder 42 of the upper target wheel 40, and a second intermediate focus target is located in a upper target position 72 of a target holder 42 of the lower target wheel 41. A closest focus target 108 is located in a lower target position 73 of a target holder 42 of the lower target wheel 41.

Continuing to refer to FIG. 9A, the farthest focus target 105 occupies one quarter of the target position 72 of the upper target wheel 40 while the first intermediate target 106 occupies one quarter of the target position 73 of the upper target wheel. The second intermediate focus target 107 occupies one quarter of the target position 72 in the lower target wheel while and the closest focus target 108 occupies one quarter of the target position 73 of the lower target wheel 41. The target wheel 40 is adjusted along the optical axis 46 by the stepper motor 77 to provide a setting for the farthest focus target 105 from the MUT 51 (FIG. 3) and the target wheel 41 is adjusted along the optical axis 46 by the stepper motor 78 to provide a setting for the closest focus target 108 from the MUT 51. The field lens is then adjusted by the stepper motor 79 to focus a combination image of the targets 105, 106, 107 and 108 onto the lens opening on the lens cap 49 (FIG. 3). The adjustment setting of the stepper motors 77, 78 and 79 are then recorder for use in the focusing of a MUT using the combination of focus targets 105, 106,107 and 108.

FIG. 9B shows the image of the combination of focus targets 105, 106, 107 and 108 as seen by the MUT 51. The focus target consists of light areas (holes) 81, 86, 91 and 96 and dark areas (no-holes) 82. The preferred hole shape is circular; however, other shapes such as rectangular, hexagonal, octagonal, oval, etc., can be used. The holes 96 of the closest target 108 are the smallest followed by the second intermediate target 107 having the next smallest holes. The holes in the first intermediate target 106 are larger than the holes in the second intermediate target 107 while the holes in the farthest target 105 are the largest. The hole pattern shown in FIG. 8B is for illustrative purposes and does not necessarily represent the hole pattern in the actual focus target. The focus stepper 44 (FIG. 3) adjusts the lens cap 49 until a maximum brightness is attained of the focus target image that is captured by the MUT 51.

In focusing a MUT the lens cap is adjusted for a maximum contrast in the image between dark 82 and light areas 81, 86, 91 and 96 and also the sharpness of the transition between the dark and light areas. The brightness in LUX/lumen of the light areas 81, 86, 91 and 96 is measured and compared to an expected calculated value. An alternative approach is using a FFT (Fast Fourier Transform) that looks at frequency bins and the highest frequencies. The primary focus of a MUT uses the far targets 108 and close targets 105. If the image produced by the MUT for the far 108 and close target areas is within acceptable focus limits, then the MUT is considered to be in focus. It should be noted that the tester knows which area of the image represents represent the far 108, first intermediate 107, second intermediate 106 and close 105 target areas, and is easily able to operate on the respective areas to determine an acceptable focus.

Figure 10:
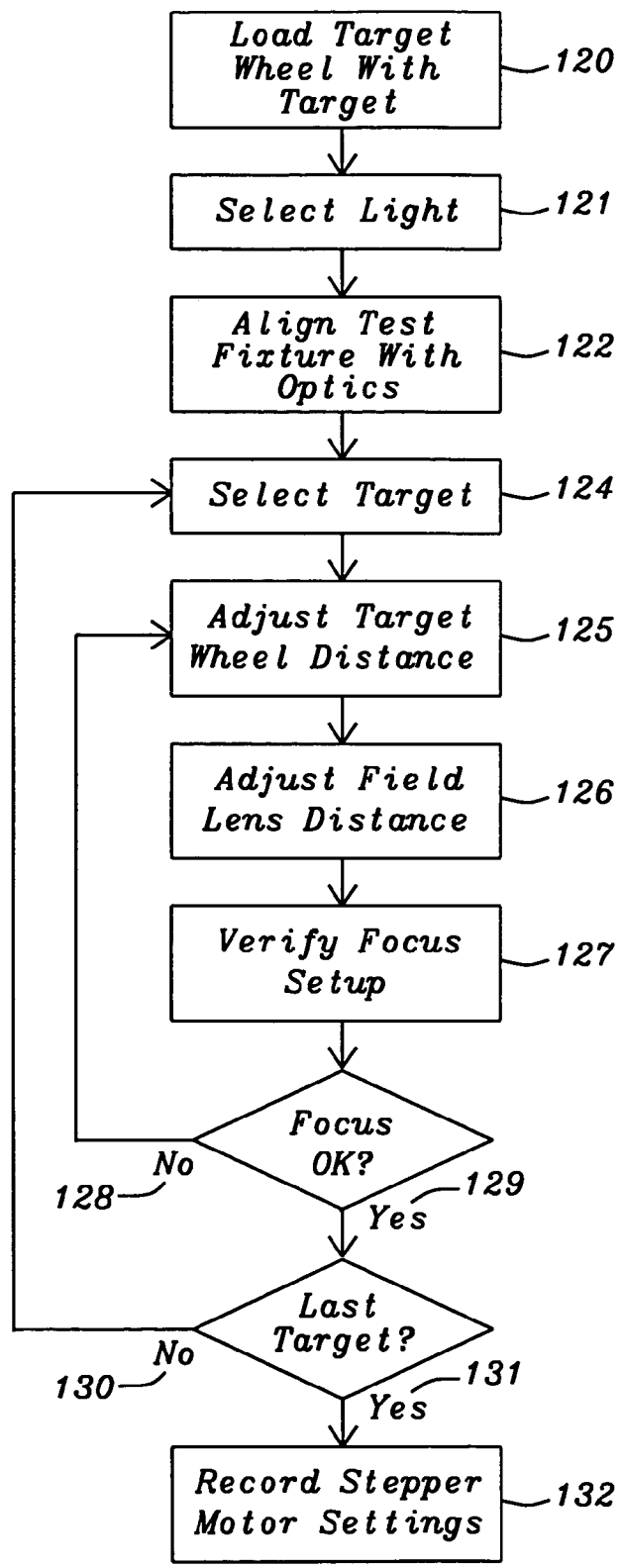
FIG. 10 is a flow diagram of the method to establish and verify the focus setup of the optics system of the present invention.

In FIG. 10 is a flow diagram of a method for setting up focus target distances from a previously focused digital camera module under test (PFM). A target holder within a target wheel is loaded with a focus target 120. A target position 72 furthest from the PFM in the target wheel 40 furthest from the MUT is loaded with a far distance target 80 as shown in FIG. 4A. A target position 73 closest to the PFM in the target wheel 40 furthest from the PFM is loaded with a first intermediate distance target 85 as shown in FIG. 5A. A target position 72 furthest from the PFM in the target wheel 41 closest to the PFM is loaded with a second intermediate target 90 as shown in FIG. 6A. A target position 73 closest to the PFM in the target wheel 41 closest to the PFM is loaded with a close distance target 95 as shown in FIG. 7A.

Continuing to refer to FIG. 10, a light for illuminating the target is selected 121 and a test fixture containing the PFM is aligned with an optical centerline 122. A target is selected 124 by rotating the target wheel until the target holder containing the focus target is over an optical centerline. The distance of the target wheel 125 from the PFM is adjusted using a stepper motor. The field lens is then adjusted 126 to focus the target onto the lens opening in the lens cap of the PFM. The stepper motors adjust the distance of the target wheel and the field lens until a maximum brightness of the image of the focus target is obtained by the PFM. The focus setup is then verified 127 by manual inspection. The manual inspection is preferably done with the customer of the digital camera modules that are to be tested since best focus is subjective and can be viewed differently by different people. If the focus of the target is not acceptable 128 during verification, the target wheel distance is re-adjusted 125 with a re-adjustment of the field lens 126. The focus setting is again manually verified 127. If the focus setting is found to be acceptable 129 and the distance of last target has not been established 130, then steps 124 through 130 are repeated. If the distance setting of the last target 131 has been established, then the stepper motor settings are then recorded 132 in tester memory for use in the test of the digital camera product.

Figure 11:
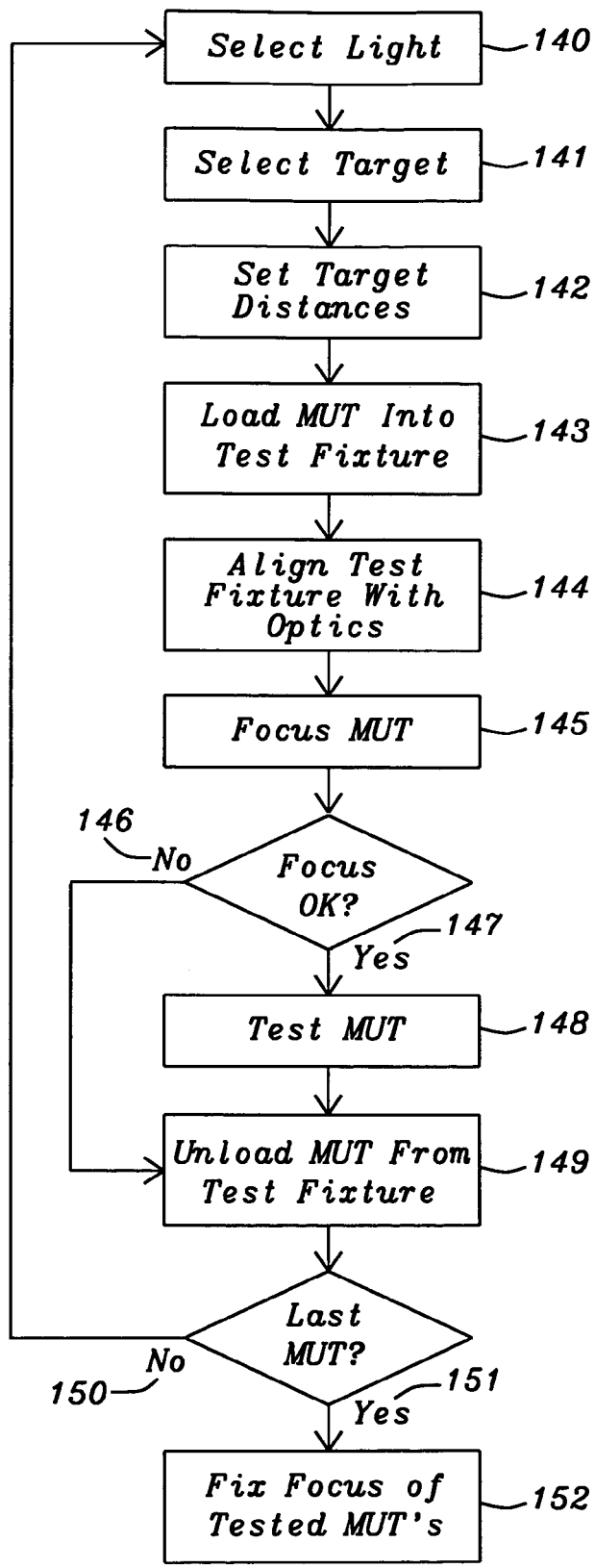
FIG. 11 is a flow diagram of the method to focus a MUT of the present invention.

In FIG. 11 is a flow diagram of a method for focusing a digital camera module under test (MUT). In the test station 13a and 13b (FIG. 1) a light source is selected 140 to illuminate the focus targets. The focus target, or a combination of focus targets, that are to be used to focus the MUT are selected 141. The stepper motors 76 (FIG. 3) are used to position the selected target, or combination of targets, over the optical centerline of the test station by rotating the target wheels. A focus target, as shown in FIG. 4A through FIG. 7A, or a combination of focus targets, as shown in FIG. 8A and FIG. 9A, are selected by the rotational position of the target wheels. The target distance and the field lens distance are set 142 according to the settings determined in the procedure shown in FIG. 10. If only one target is being used, the stepper motor 77 and 78 (FIG. 3) controlling the distance from the MUT of the target wheel containing the target and the stepper motor 79 (FIG. 3) controlling the distance from the MUT of the field lens are set according to the results obtained in the procedure of FIG. 10. If there is a combination of targets, which use both target wheels 40 and 41, then the stepper motors 77 and 78 controlling the distance from the MUT of the two target wheels and the stepper motor 79 controlling the distance from the MUT of the field lens are set according to the to the results of the procedure of FIG. 10.

Continuing to refer to FIG. 11, an untested MUT is loaded into a test fixture 143 from a transport tray 14 (FIG. 1) containing digital camera modules. The test fixture is then aligned with an optical centerline of the test station 144. The MUT is focused 145 using a stepper motor driven focusing unit 44 (FIG. 3) that physically contacts the lens cap of the MUT and turns the lens cap to adjust the focus of the MUT. In focusing a MUT, the lens cap is adjusted for a maximum contrast in the image between dark and light areas of the target as well as the sharpness of the transition between the dark and light areas. An alternative approach for determining a best focus is using a FFT (Fast Fourier Transform) to analyze frequency content and the highest frequencies of the FFT of a focus image of the MUT. If the MUT is found not to be able to be focused 146, the particular MUT is returned the transport tray. The inability to focus a MUT comprises a mechanical problem with the lens holder, dirt inside the MUT and a defect of the lens of the MUT. If the MUT can be focused 147, the MUT is then tested 148 and is unloaded from the test fixture to the transport tray upon completion of test 149. If there are additional untested digital camera modules on the transport tray 150, the focus and test procedure is repeated 140 through 150. If the last MUT has been focused and tested 151, the transport tray 14 is moved to a tray out area 22 (FIG. 1) and the focus adjustment made on the digital camera modules during the focus procedure is permanently fixed 152 by use of glue or other mechanically fixing methods that permanently connect the lens cap to the body of the digital camera module and prevent the turning of the lens cap relative to the body of the module.

While the invention has been particularly shown and described with reference to preferred embodiments thereof, it will be understood by those skilled in the art that various changes in form and details may be made without departing from the spirit and scope of the invention.

What is claimed is:

1. An apparatus for focusing a digital camera module, comprising:
   a) a fixture to hold digital camera module under test (MUT),
   b) a light source,
   c) a plurality of target wheels,
   d) a focus target,
   e) a field lens,
   f) a focus mechanism,
   g) said light source illuminates said focus target located in said plurality of target wheels above said MUT,
   h) said field lens focuses an image of said focus target onto a lens opening in said MUT,
   i) said focus mechanism adjusts a lens cap of said MUT to obtain a best focus.

2. The apparatus of claim 1, wherein said plurality of target wheels comprises a plurality of target holders to contain a plurality of said focus targets.

3. The apparatus of claim 2, wherein said plurality of target holders is six in each of said plurality of target wheels.

4. The apparatus of claim 2, wherein said plurality of target holders contains two target locations in each target holder.

5. The apparatus of claim 1, wherein said plurality of target wheels is two target wheels.

6. The apparatus of claim 1 wherein said focus target comprises dark and light areas.

7. The apparatus of claim 6, wherein said light areas are holes.

8. The apparatus of claim 7, wherein said holes are round.

9. The apparatus of claim 1, wherein said focus target is a far distance focus target.

10. The apparatus of claim 1, wherein said focus target is an intermediate distance focus target.

11. The apparatus of claim 1, wherein said focus target is a close distance focus target.

12. The apparatus of claim 1, further comprising;
   a) a target holder comprising a first target location and a second target location located below said first target location,
   b) a first target wheel of said plurality of target wheels comprising at least one said target holder,
   c) a second target wheel of said plurality of target wheels comprising at least one said target holder
   d) a first stepper motor to locate said first target wheel along an optical axis at a first distance from said MUT,
   e) a second stepper motor to locate said second target wheel along said optical axis at a second distance from said MUT,
   f) a third stepper motor to position said field lens along said optical axis at a third distance from said MUT, g) a fourth stepper motor to position said target holder contained within the first target wheel over said optical axis,
h) a fifth stepper motor to position said target holder contained within said second target wheel over said optical axis.

13. The apparatus of claim 12, wherein said focus target is contained in the first target location of said target holder located furthest from said MUT.

14. The apparatus of claim 12, wherein said focus target is contained in the second target location of said target holder located closest to said MUT.

15. The apparatus of claim 12, further comprising:
a) a portion of a far distance focus target located in said first target position in said target holder located in said first target wheel,
b) a portion of a close distance focus target located in said second target position in said target holder located in said second target wheel,
c) said portion of the far distance focus target and said portion of the close distance focus target arranged within said target holders to allow both target portions to be viewed simultaneously by said MUT.

16. The apparatus of claim 15, wherein said portion of the far distance focus target and said portion of the close distance focus target each occupy one half of said target holder.

17. The apparatus of claim 15, wherein said first target wheel is located furthest from said MUT.

18. The apparatus of claim 15, wherein said second target wheel is located closest to said MUT.

19. The apparatus of claim 12, further comprising:
a) a portion of a far distance focus target located in said first target position within said target holder located in said first target wheel,
b) a portion of a first intermediate focus target located in said second target position within said target holder located in said first target wheel,
c) a portion of a second intermediate focus target located in said first target position within said target holder located in said second target wheel,
d) a portion of a close focus target located in said second target position within said target holder located in said second target wheel,
e) said portions arranged within said target holders to allow the portions to be viewed simultaneously by said MUT.

20. The apparatus of claim 19, wherein said portion of the far distance focus target and the portion of the first intermediate focus target each occupy one quarter of a target holder located in the first target wheel, and the portion of the second intermediate focus target and the portion of the close focus target each occupy one quarter of said target holder in the second target wheel.

21. The apparatus of claim 19, wherein said first target wheel is located furthest from said MUT.

22. The apparatus of claim 19, wherein said second target wheel is located closest to said MUT.

23. A method of establishing a focus setup of an optics system for focusing a miniature digital camera module, comprising:
a) loading a target holder of a target wheel with a focus target,
b) selecting a light source,
c) aligning a test fixture containing a previously focused digital camera module (PFM) with an optic center line,
d) selecting said target holder to be over said optic center line,
e) adjusting said target wheel distance from said PFM,
f) adjusting a field lens to focus an image of said focus target onto a lens opening in said PFM,
g) verifying adjustment of said target wheel and said field lens,
h) repeating steps e) through g) until said adjustment is acceptable,
i) recording said adjustment for use in focusing digital camera modules.

24. The method of claim 23, wherein focus target is a far distance target loaded into a target position of said target holder furthest from said PFM.

25. The method of claim 23, wherein focus target is an intermediate distance target loaded into a target position of said target holder closest to said PFM.

26. The method of claim 23, wherein focus target is an intermediate distance target loaded into a target position of said target holder furthest from said PFM.

27. The method of claim 23, wherein focus target is a close distance target loaded into a target position of said target holder closest to said PFM.

28. The method of claim 23, wherein verifying adjustment setup of said target wheel and said field lens is by visual observation.

29. A method of focusing a miniature digital camera module, comprising:
a) selecting a light source,
b) selecting a focus target,
c) setting target distances,
d) loading a digital camera module under test (MUT) into a test fixture,
e) aligning said test fixture to an optic centerline,
f) adjusting a focus setting of said MUT,
g) rejecting said MUT that cannot be focused and unloading from said test fixture,
h) testing said MUT that can be focused,
i) unloading a tested MUT from said test fixture,
j) repeating steps a) through i) until a last MUT is focused and tested,
k) fixing the focus setting of said MUT.

30. The method of claim 29, wherein adjusting said focus setting of said MUT further comprises:
a) measuring a contrast between light areas and dark areas of said focus target,
b) measuring a sharpness in the transition between said light and dark areas.

31. The method of claim 30, wherein adjusting said focus setting of said MUT uses FFT (Fast Fourier Transforms) to determine a best focus by analyzing frequency content and highest frequencies of said FFT of a focus image of said MUT.

32. The method of claim 29, wherein said focus target is a far distance target.

33. The method of claim 29, wherein said focus target is an intermediate distance target.

34. The method of claim 29, wherein said focus target is a close distance target.

35. The method of claim 29, wherein setting said target distances uses stepper motors to adjusts the distance from the MUT of the target and a field lens.

36. The method of claim 29, wherein said focus target is a combination of a far distance target and a close distance target.

37. The method of claim 36, wherein said far distance target is located in a first target position of a target holder in a first target wheel furthest from said MUT and said close distance target is located in a second target position of said target holder in a second target wheel closest to said MUT.

38. The method of claim 36, wherein the far distance and the close distance target each occupies one half of a target holder in a fashion that said MUT views an image of each target simultaneously.

39. The method of claim 29, wherein said focus target is a combination of a far distance target, a first intermediate distance target, a second intermediate distance target and a close distance target.

40. The method of claim 39, wherein said far distance target is located in a first target position of a target holder in a first target wheel furthest from said MUT, said first intermediate target is located in a second target position of the target holder in the first target wheel closer to said MUT than the far distance target, said second intermediate target is located in the first target position of the target holder in a second target wheel closer to said MUT than the first intermediate target, and said close distance target is located in the second target position of the target holder in the second target wheel closer to said MUT than the second intermediate target.

41. The method of claim 39, wherein the far distance, the first intermediate, the second intermediate and the close distance target each occupies one quarter of a target holder in a fashion that said MUT views an image of each target simultaneously.

42. The method of claim 29, wherein fixing said focus uses glue to permanently bond a lens cap of said MUT to a body of said MUT.

* * * * *